United States Patent
Wolczko

(10) Patent No.: US 12,131,163 B2
(45) Date of Patent: Oct. 29, 2024

(54) PROCESSOR SUPPORTING SELF-RELATIVE ADDRESSING MODES

(71) Applicant: Oracle International Corporation, Redwood City, CA (US)

(72) Inventor: Mario Wolczko, San Carlos, CA (US)

(73) Assignee: Oracle International Corporation, Redwood City, CA (US)

( * ) Notice: Subject to any disclaimer, the term of this patent is extended or adjusted under 35 U.S.C. 154(b) by 671 days.

(21) Appl. No.: 17/246,482

(22) Filed: Apr. 30, 2021

(65) Prior Publication Data

US 2022/0350613 A1 Nov. 3, 2022

(51) Int. Cl.
*G06F 9/445* (2018.01)
*G06F 12/06* (2006.01)

(52) U.S. Cl.
CPC .............. *G06F 9/445* (2013.01); *G06F 12/06* (2013.01)

(58) Field of Classification Search
CPC ....... G06F 9/445; G06F 12/06; G06F 12/0223
See application file for complete search history.

(56) References Cited

U.S. PATENT DOCUMENTS

| | | | |
|---|---|---|---|
| 9,940,229 B2 | 4/2018 | Shen et al. | |
| 10,802,984 B2 | 10/2020 | Sanjeepan et al. | |
| 2002/0013866 A1* | 1/2002 | Noeldner | G06F 13/28 710/22 |
| 2004/0169657 A1* | 9/2004 | Morgan, III | G06T 15/005 345/501 |
| 2007/0033419 A1* | 2/2007 | Kocher | G11B 20/00884 713/193 |
| 2009/0055630 A1* | 2/2009 | Isshiki | G06F 11/004 712/216 |
| 2013/0097405 A1* | 4/2013 | Thorvaldsson | G06F 9/355 711/216 |
| 2013/0205285 A1* | 8/2013 | Pizlo | G06F 9/45516 717/151 |
| 2014/0344602 A1* | 11/2014 | Son | G06F 8/4432 713/323 |
| 2014/0379986 A1* | 12/2014 | Troester | G06F 9/30043 711/132 |
| 2015/0169226 A1* | 6/2015 | Shen | G06F 12/0238 711/103 |

(Continued)

OTHER PUBLICATIONS

Bill Bridge, "NVM Direct Open Source Non-Volatile Memory API", Oracle Copyright 2015, pp. 1-24.

*Primary Examiner* — Tuan C Dao
(74) *Attorney, Agent, or Firm* — S. Scott Foster; Kowert, Hood, Munyon, Rankin & Goetzel, P.C.

(57) ABSTRACT

A processor may implement self-relative memory addressing by providing load and store instructions that include self-relative addressing modes. A memory address may contain a self-relative pointer, where the memory address stores a memory offset that, when added to the memory address, defines another memory address. The self-relative addressing mode may also support invalid memory addresses using a reserved offset value, where a load instruction providing the self-relative addressing mode may return a NULL value or generate an exception when determining that the stored offset value is equal to the reserved offset value and where a store instruction providing the self-relative addressing mode may store the reserved offset value when determining that the pointer is an invalid or NULL memory address.

18 Claims, 11 Drawing Sheets

(56) References Cited

U.S. PATENT DOCUMENTS

| | | | |
|---|---|---|---|
| 2016/0378679 A1* | 12/2016 | Cintra | G06F 9/44568 |
| | | | 711/206 |
| 2017/0063733 A1* | 3/2017 | Lawson | H04L 47/34 |
| 2020/0233670 A1* | 7/2020 | Alexander | G06F 9/3455 |
| 2021/0026837 A1 | 1/2021 | Talagala et al. | |
| 2021/0096861 A1* | 4/2021 | Wang | G06F 9/30047 |

* cited by examiner

PROCESSOR SUPPORTING SELF-RELATIVE ADDRESSING MODES

BACKGROUND

Field of the Disclosure

This disclosure relates generally to computer hardware and software, and more particularly to systems and methods for implementing self-relative memory pointers to provide position-independent data structures.

Description of the Related Art

Non-volatile memory may persist data stored in the non-volatile memory in the event of power loss, system reboots, application restarts, or various other scenarios which would otherwise cause a volatile memory to no longer store data. Various applications may utilize non-volatile memory in order to execute. For example, an application may store data in the non-volatile memory before completing execution. When the application is executed again, the application may obtain the data stored in the non-volatile memory to continue execution as if the application had never stopped executing.

SUMMARY

Methods, techniques and systems for providing a processor implementing self-relative memory addressing are disclosed. A processor implementing self-relative memory addressing may provide load and store instructions that include self-relative addressing modes. These load and store instructions may load an absolute memory address from a specified location of memory that may contain a self-relative pointer. This location may store a memory offset that, when added to the absolute memory address of the location, defines another absolute memory address. As applications commonly rely on memory pointers storing reserved values indicating illegal or invalid memory locations, the self-relative addressing mode may also support invalid memory addresses using a reserved offset value, where a load instruction providing the self-relative addressing mode may return a NULL value or generate an exception when determining that the stored offset value is equal to the reserved offset value and where a store instruction providing the self-relative addressing mode may store the reserved offset value when determining that the pointer is an invalid or NULL memory address.

Figure 1:
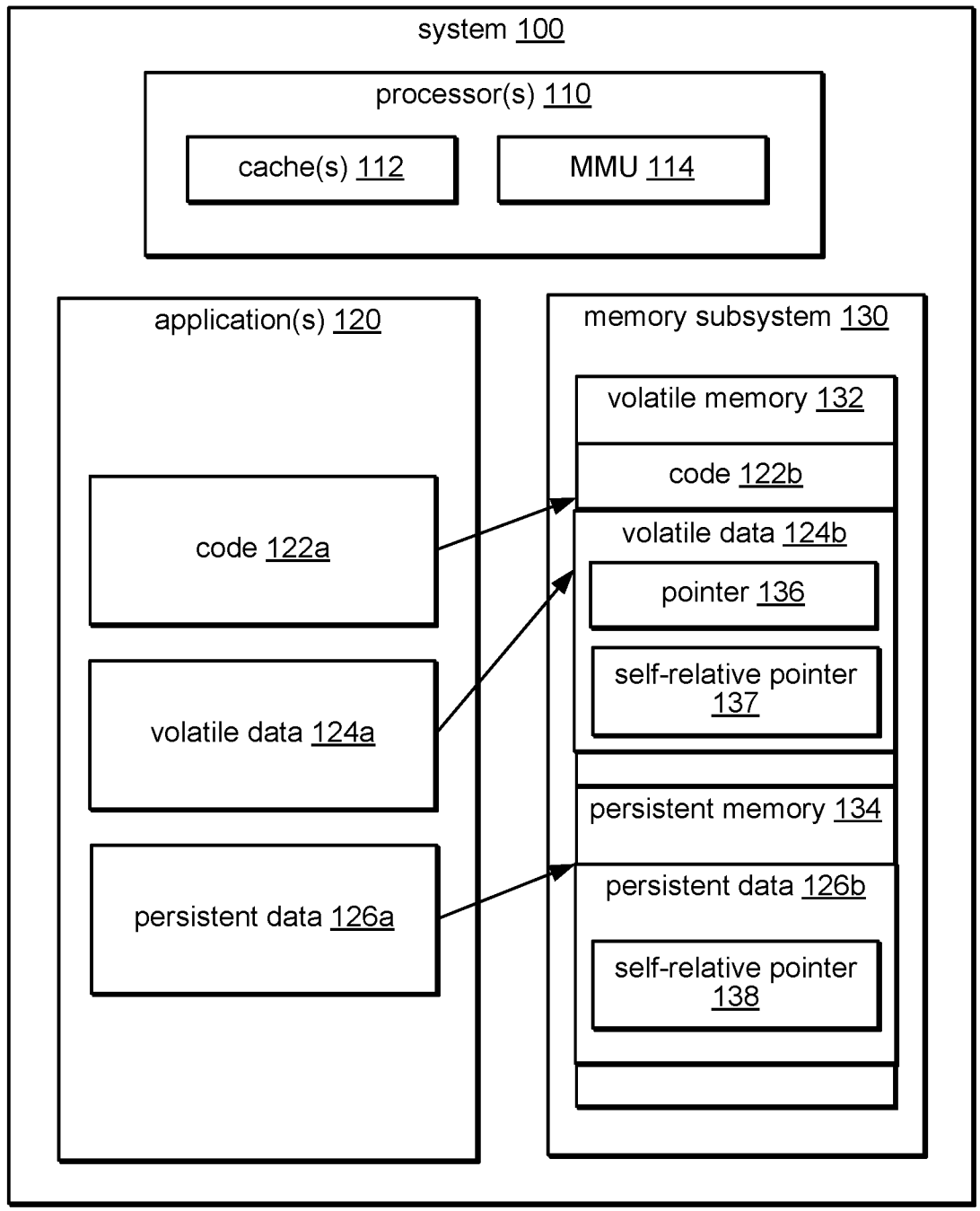
FIG. 1 is a block diagram illustrating a system including a processor supporting self-relative addressing modes in various embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for a processor supporting self-relative addressing modes are described. Computer applications employ data structures that include pointers (e.g., variables containing memory addresses) to various other data structures, variables or fields. As the memory address space of an application is stable throughout execution, the application may rely on the locations of various data structures and use absolute memory locations in pointer storage. However, with the advent of non-volatile memory (e.g., persistent, byte-addressable memory) these assumptions of memory stability may be invalid as data stored in persistent data structures may outlast the lifetime of a single execution of an application.

Furthermore, persistent data structures may be implemented at different times and places, as will instantiations of those data structures with actual data. Therefore, there may arise situations in which two or more of these structures have to be operated upon by the same application at the same time in a way that could not have been anticipated when any of the data structures were instantiated. If these structures use absolute memory addresses as pointers, the data structures may conflict in the choice of addresses, preventing simultaneous use. Techniques for a processor supporting self-relative addressing modes may provide a new form of pointer that is position-independent and may be supported in a performant manner.

For example, non-volatile memory (e.g., persistent byte-addressable memory (PMEM), such as Intel Optane Persistent Memory) and non-volatile RAM (NVRAM), may store persistent data structures that outlast the lifetime of a single execution of an application. While consecutive invocations of the same application may result in consistent memory addressing, varying data addresses may be used to combat certain kinds of malware (e.g. Address Space Layout Randomization). Moreover, operating Systems may generally reserve the right to map data at different addresses across invocations making addressing of persistent data structures with absolute pointer addresses problematic.

One approach is to constrain persistent data structures to use only self-relative pointers. A self-relative pointer stored at address A which points to address B may store the value B−A. When accessed, the value stored in the pointer is added to its address to yield the address of the target. When the pointer is changed, say to point to address C, its new value is obtained by subtracting the address of the pointer before being stored; in this case, C−A is stored in A.

Such an approach may be implemented in software providing performance is close to that of traditional absolute addressing. Performance, however, may be dependent on how well the processor microarchitecture used can hide extra additions and subtractions. On some systems, e.g., Intel x86, this may be accomplished using available complex addressing modes.

However, applications may commonly use a special memory address value, known as a NULL value or NULL pointer, to indicate the existence of an invalid memory address. Therefore, memory pointers, in addition to referencing other memory locations, may assume a value which indicates that no valid memory address is stored. Most systems use zero as a NULL pointer value and arrange for a region of memory including the zero address to be protected such that if a NULL pointer is used to access memory (which is an error) a fault or processor exception may be generated without requiring extra instructions to explicitly test for the NULL value. Therefore, to provide complete support for self-relative, position-independent pointers, a mechanism to support NULL pointers may also be provided.

For many languages, for example Java™, a pointer may only point to an object and not another pointer. Therefore, zero can be used as a reserved value indicating an invalid self-relative address since a pointer cannot point to itself. However, in C and related languages a pointer may point to another pointer or to itself, thus a zero offset cannot be used. A possible alternative is to use an offset of 1 to represent a NULL pointer, as modern computing platforms may require multiple bytes to store a pointer and pointing into the middle of a pointer would never be useful. Regardless of choice of reserved offset value, however, performance of pointer accesses may be reduced as NULL pointers may have to be explicitly tested on both access and update. Implemented in software, this approach may result in larger application sizes and/or slower execution because of extra instructions required regardless of whether these operations are added inline or are included in subroutines.

Various embodiments of processor instructions implementing self-relative, position-independent addressing are disclosed herein. Using these instructions, self-relative pointers may be immediately converted to absolute addresses when loaded and only converted to self-relative offsets when stored. With these instructions, self-relative pointers may be supported without further changes to existing software. Furthermore, full support for existing memory addressing techniques, including the use of NULL pointers, may be provided without impact to application performance or code size.

FIG. 1 is a block diagram illustrating a system including processors supporting self-relative addressing modes according to various embodiments. A system 100 may include one or more processors 110 capable of executing instructions that include self-relative addressing modes. These processors may include one or more caches 112 and memory management units (MMUs) 114 coupling the processors to a memory subsystem 130.

The memory subsystem may further include volatile memory 132 and persistent memory 134. An exemplary system 100 is discussed in further detail below in FIG. 7.

The system 100 may execute one or more applications 120 which may employ persistent memory 134 to store persistent data structures as part of persistent data 126a. The application(s) 120 may include separate code 122a and volatile data 124a that may be stored in non-persistent, or volatile, memory 132. During application initialization, volatile code and data, such as code 122a and volatile data 124a, may be assigned specific addresses in the memory subsystem 130 and may then be initialized. For this reason, memory pointers, such as pointer 136, may be configured to directly store absolute memory addresses, as these addresses may remain consistent for the duration of application execution.

Persistent data 126a stored in persistent memory 134, however, may be preserved across multiple executions of a single application. As such, an application may not initialize such persistent data if that data has been initialized during a previous execution. However, current memory subsystem 130 configuration and application 120 configuration may be inconsistent for different executions of a given application 120, leading to memory addresses of persistent data becoming inconsistent over time. This may be caused by Operating Systems varying mappings of data to different addresses across application invocations to combat certain kinds of malware or it may be due to various persistent data structures being created at different times and by different applications. Therefore, it may be possible for two or more of these structures to have conflicts in the choice of addresses. As a result, pointers in persistent data 126a structures may implement self-relative pointers 138 rather than absolute pointers 136 as used in volatile data structures 124a.

Code 122a of the application 120 may be mapped to a region of volatile memory 132 of the memory subsystem 130 as shown in code 122b. Similarly, volatile data 124a of the application 120 may be mapped to a region of volatile memory 132 of the memory subsystem 130 as shown in code 124b and persistent data 126a of the application 120 may be mapped to a region of persistent memory 134 of the memory subsystem 130 as shown in code 126b. In some embodiments these mappings may be performed by respective memory management units (MMUs) 114 of the processor(s) 110. In these embodiments the memory addresses used in pointers 136 and 138 may therefore be virtual memory addresses. In other embodiments, however, the memory addresses used in pointers 136 and 138 may be physical memory addresses.

Code 122a of the application 120 may, in some cases, be configured to access pointers in memory without knowledge of whether the pointers are conventional, absolute pointers or are self-relative pointers. For example, when the code 122a is generated, such as by a compiler as discussed in further detail in FIG. 9, it may not always be able to be determined if the memory storing a pointer is persistent or volatile. Examples of such pointers are pointers stored in a stack or heap. For these reasons, self-relative pointers, such as self-relative pointer 137, may be employed even if the memory storing the self-relative pointer is volatile memory 132.

Figure 2:
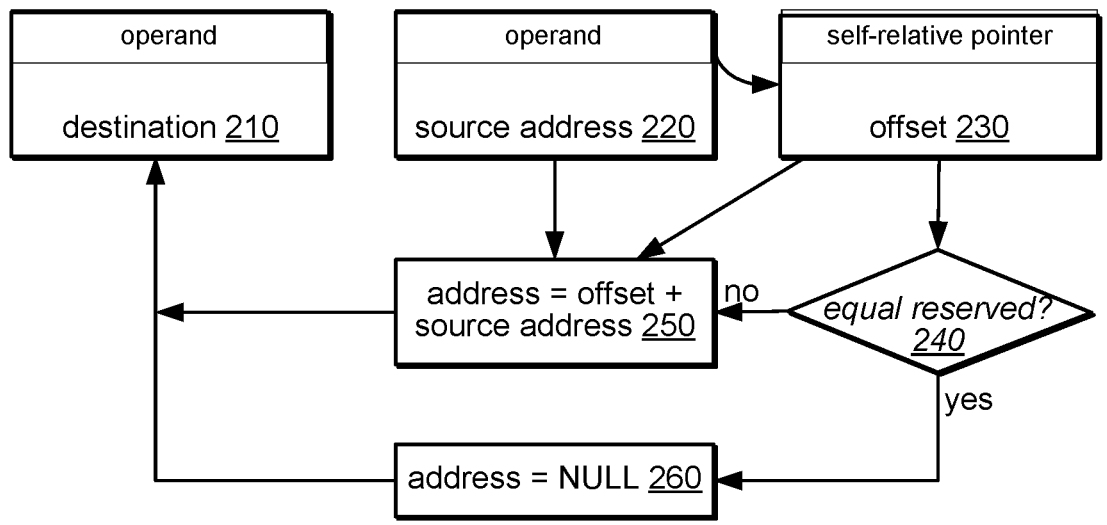
FIG. 2 is a block diagram illustrating an embodiment implementing a load-relative instruction that supports self-relative, position-independent addressing.

FIG. 2 is a block diagram illustrating an embodiment implementing a load-relative instruction that supports self-relative, position-independent addressing. This load-relative instruction may be implemented, for example, on the processor(s) 110 as shown in FIG. 1 to support self-relative, position-independent pointers such as self-relative, pointer 138 shown in FIG. 1.

A load-relative instruction 200 may include two or more operands, a destination operand 210 and a source address operand 220. Of the operands, the source address 220 may contain an absolute memory address while the destination 210 may contain any valid destination specification, for example an absolute memory address or a processor register. As discussed in FIG. 1, these absolute memory addresses may be virtual memory addresses in some embodiments while in other embodiments they may be physical memory addresses.

The absolute memory address provided in the source address 220 may be used to identify a memory location that may store a self-relative pointer, in some embodiments. This self-relative pointer may contain an offset 230.

The load-relative instruction 200 may first determine an absolute memory address for the self-relative pointer as shown in 240, 250 and 260. Should the offset 230 contain a reserved offset value, as determined in 240, the absolute memory address may be determined to be an address value that indicates an invalid memory location. In some embodiments, this address value indicating an invalid memory location may be a NULL, or zero, value. Should the offset 230 not contain a reserved offset value, as determined in 240, the absolute memory address may be determined to be the sum of the offset 230 and the source address 220, in some embodiments.

In various embodiments, the reserved offset value and the address value indicating an invalid memory location may be determined in a variety of ways. In some embodiments, these values may be included as part of processor instruction set architecture (ISA). In other embodiments, these values may not be predefined by may instead be provided as additional operands of the load-relative instruction 200. For example, such operands may be constants encoded in the binary encoding of the instruction or may be provided in registers as specified by such additional operands. In still other embodiments, these constants may be provided in predetermined or dedicated registers of the processor. These various examples, however, are not intended to be limiting and any number of arrangements for these reserved values may be envisioned.

Once an absolute memory address for the self-relative pointer is determined, the load-relative instruction 200 may store the absolute memory address in the destination identified by the destination 210. In some embodiments, this destination may be a processor register while in other embodiments it may also be a memory location. These various examples, however, are not intended to be limiting and any number of arrangements for these reserved values may be envisioned.

Figure 3:
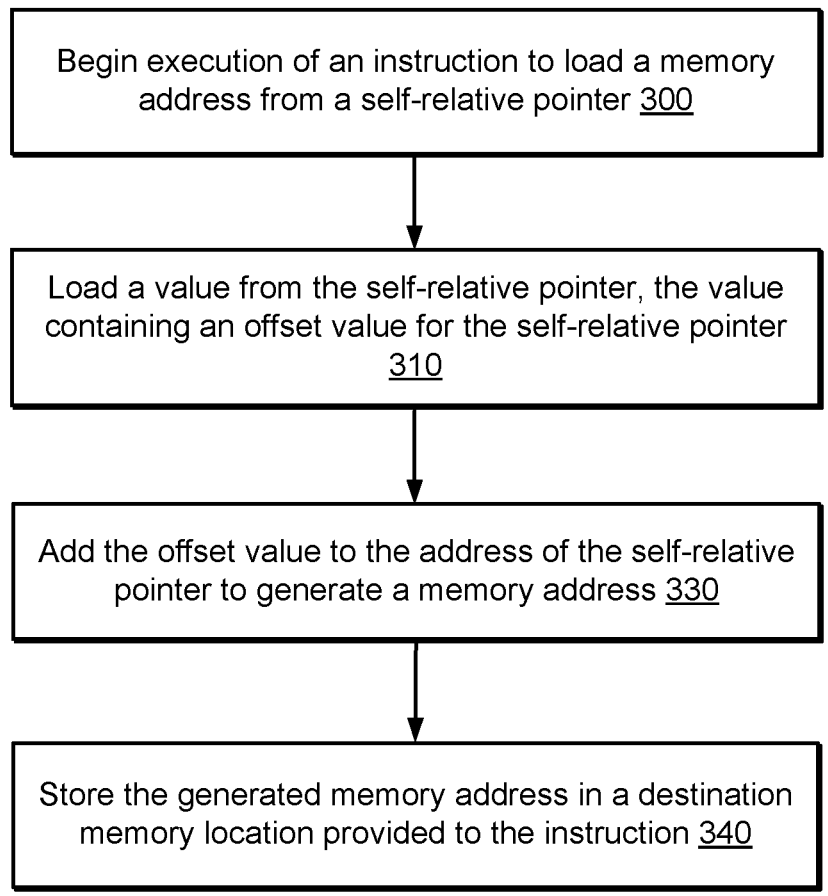
FIG. 3 is a flow diagram illustrating an embodiment of load-relative instruction that supports self-relative, position-independent addressing.

FIG. 3 is a flow diagram illustrating an embodiment of load-relative instruction that supports self-relative, position-independent addressing. The process begins at step 300 where a processor providing self-relative, position-independent addressing, such as the processor(s) 110 as shown in FIG. 1, begins execution of a load instruction, such as the load-relative instruction 200 as shown in FIG. 2, with the load instruction loading a memory address from a self-relative pointer, such as the self-relative pointer 138 as shown in FIG. 1. The load instruction may include two or more operands in some embodiments, as discussed in FIG. 2, including a destination operand and a source address operand. As discussed in FIG. 1, memory addresses supported by the load instruction may be virtual memory addresses in some embodiments while in other embodiments they may be physical memory addresses.

As shown in step 310, an offset value may be loaded from the self-relative pointer identified by the source address operand, in some embodiments. Then, in step 330, the loaded offset value may be added to the source address to generate an absolute memory address. Once an absolute memory address has been generated, the absolute memory address may be stored in a location specified by the destination operand, as shown in 340, in some embodiments. In some embodiments, this destination may be a processor register while in other embodiments it may also be a memory location. These various examples, however, are not intended to be limiting and any number of arrangements for these reserved values may be envisioned.

Figure 4:
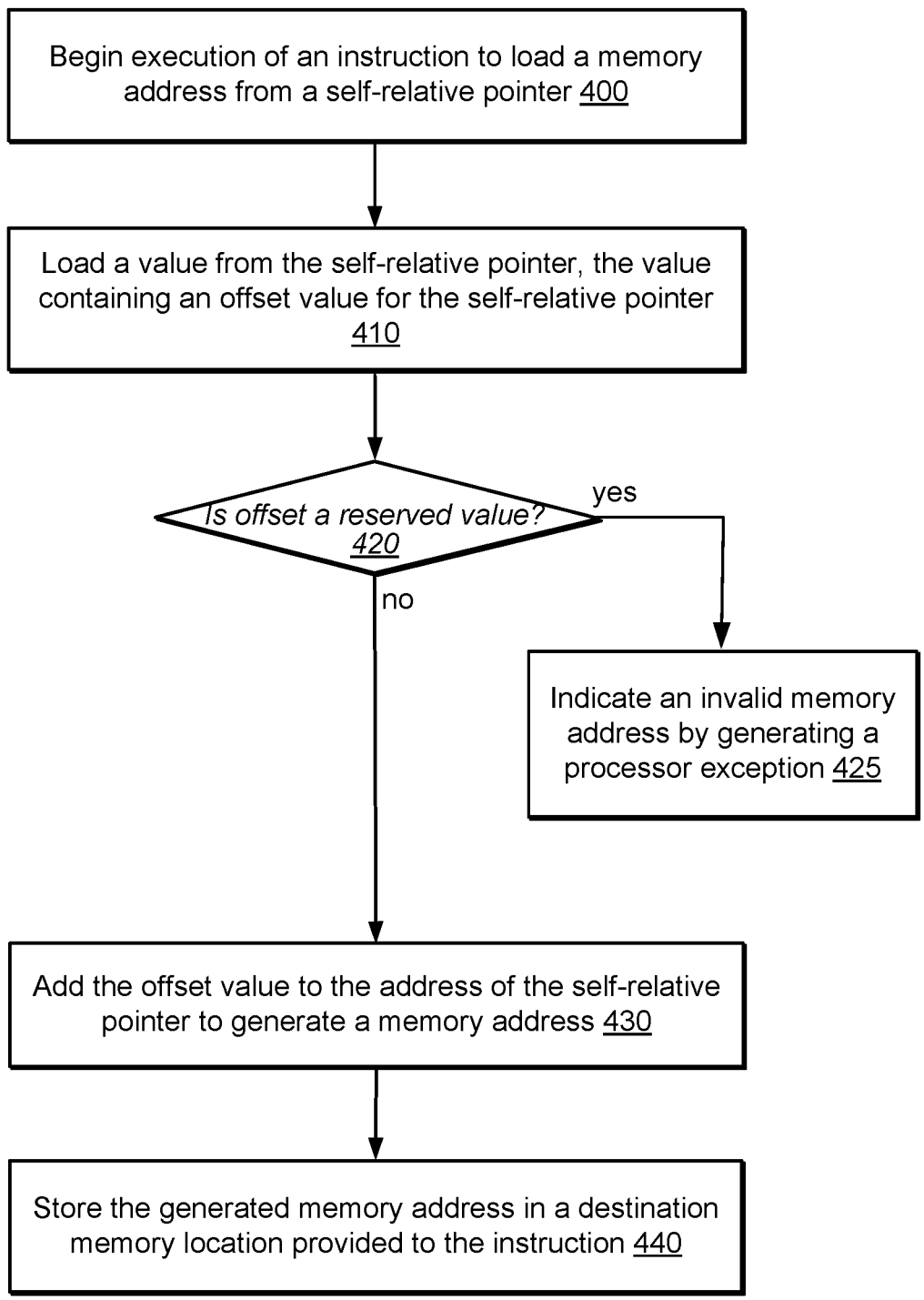
FIG. 4 is a flow diagram illustrating an embodiment of load-relative instruction that supports self-relative, position-independent addressing with invalid address support.

FIG. 4 is a flow diagram illustrating an embodiment of load-relative instruction that supports self-relative, position-independent addressing with invalid address support. The process begins at step 400 where a processor providing self-relative, position-independent addressing, such as the processor(s) 110 as shown in FIG. 1, begins execution of a load instruction, such as the load-relative instruction 200 as shown in FIG. 2, with the load instruction loading a memory address from a self-relative pointer, such as the self-relative pointer 138 as shown in FIG. 1. The load instruction may include two or more operands in some embodiments, as discussed in FIG. 2, including a destination operand and a source address operand. As discussed in FIG. 1, memory addresses supported by the load instruction may be virtual memory addresses in some embodiments while in other embodiments they may be physical memory addresses.

As shown in step 410, an offset value may be loaded from the self-relative pointer identified by the source address operand, in some embodiments. This offset value may then be compared to a reserved offset value, as shown in 420, in some embodiments. In some embodiments, this reserved offset value may be included as part of processor instruction set architecture (ISA) while in other embodiments the value may not be predefined by may instead be provided as an additional operand of the load-relative instruction 200. These examples, however, are not intended to be limiting and any number of arrangements for these reserved values may be envisioned.

If the offset value is equal to the reserved offset value, as shown in the positive exit from 420, the processor may indicate that the self-relative pointer defines an invalid memory address by generating an error signal or processor exception, as shown in 425, in some embodiments. If, however, the offset value is not equal to the reserved offset value, as shown in the negative exit from 420, the process may advance to step 430.

In step 430, the loaded offset value may be added to the source address to generate an absolute memory address. Once an absolute memory address has been generated, the absolute memory address may be stored in a location specified by the destination operand, as shown in 440, in some embodiments. In some embodiments, this destination may be a processor register while in other embodiments it may also be a memory location. These various examples, however, are not intended to be limiting and any number of arrangements for these reserved values may be envisioned.

Figure 5:
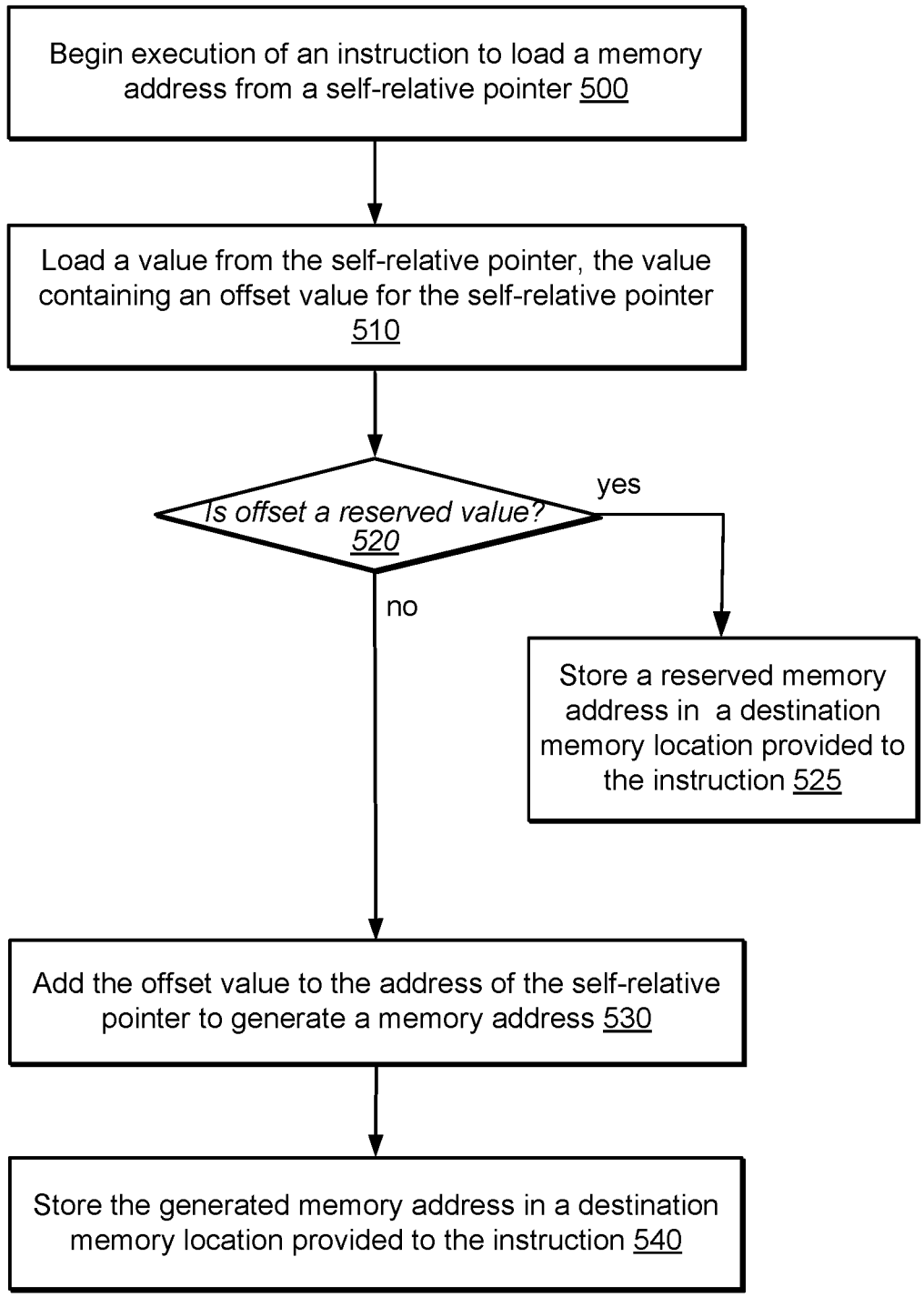
FIG. 5 is a flow diagram illustrating another embodiment of load-relative instruction that supports self-relative, position-independent addressing with invalid address support.

FIG. 5 is a flow diagram illustrating another embodiment of load-relative instruction that supports self-relative, position-independent addressing with invalid address support. The process begins at step 500 where a processor providing self-relative, position-independent addressing, such as the processor(s) 110 as shown in FIG. 1, begins execution of a load instruction, such as the load-relative instruction 200 as shown in FIG. 2, with the load instruction loading a memory address from a self-relative pointer, such as the self-relative pointer 138 as shown in FIG. 1. The load instruction may include two or more operands in some embodiments, as discussed in FIG. 2, including a destination operand and a source address operand. As discussed in FIG. 1, memory addresses supported by the load instruction may be virtual memory addresses in some embodiments while in other embodiments they may be physical memory addresses.

As shown in step 510, an offset value may be loaded from the self-relative pointer identified by the source address operand, in some embodiments. This offset value may then be compared to a reserved offset value, as shown in 520, in some embodiments. In some embodiments, this reserved offset value may be included as part of processor instruction set architecture (ISA) while in other embodiments the value may not be predefined by may instead be provided as an additional operand of the load-relative instruction 200. These examples, however, are not intended to be limiting and any number of arrangements for these reserved values may be envisioned.

If the offset value is equal to the reserved offset value, as shown in the positive exit from 520, the processor may indicate that the self-relative pointer defines an invalid memory address by storing a reserved memory address indicating an invalid memory location in a location specified by the destination operand, as shown in 525, in some embodiments. In some embodiments, this destination may be a processor register while in other embodiments it may also be a memory location. These various examples, however, are not intended to be limiting and any number of arrangements for these reserved values may be envisioned.

In some embodiments, this reserved memory address indicating an invalid memory location may be included as part of processor instruction set architecture (ISA) while in other embodiments the value may not be predefined by may instead be provided as an additional operand of the load-relative instruction 200. These examples, however, are not intended to be limiting and any number of arrangements for these reserved values may be envisioned.

If, however, the offset value is not equal to the reserved offset value, as shown in the negative exit from 520, the process may advance to step 530 where the loaded offset value may be added to the source address to generate an absolute memory address. Once an absolute memory address has been generated, the absolute memory address may be stored in a location specified by the destination operand, as shown in 540, in some embodiments. In some embodiments, this destination may be a processor register while in other embodiments it may also be a memory location. These various examples, however, are not intended to be limiting and any number of arrangements for these reserved values may be envisioned.

Figure 6:
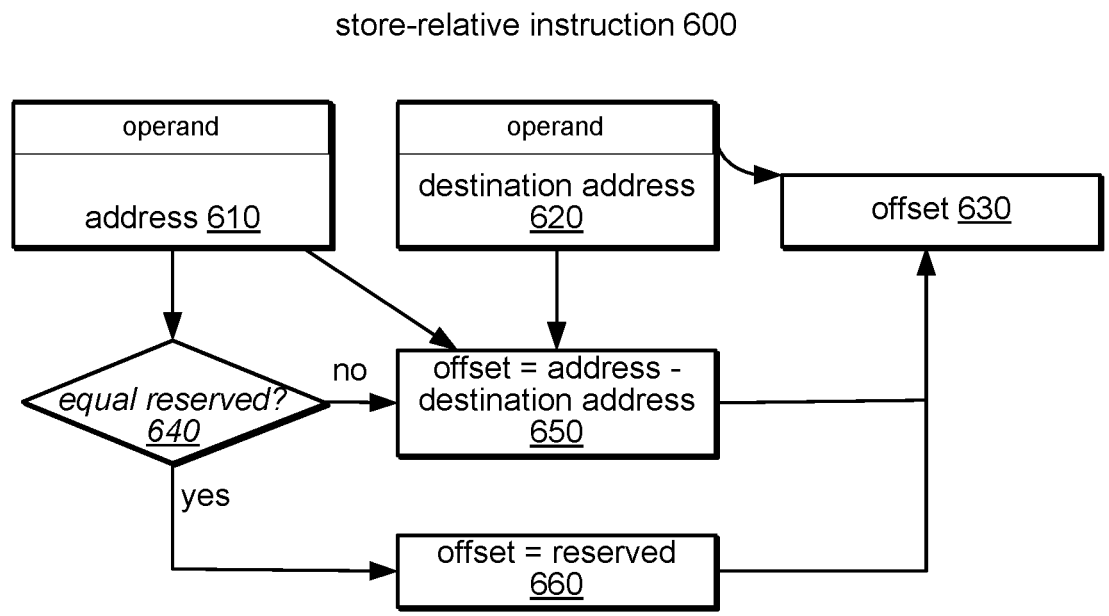
FIG. 6 is a block diagram illustrating an embodiment implementing a store-relative instruction that supports self-relative, position-independent addressing.

FIG. 6 is a block diagram illustrating an embodiment implementing a store-relative instruction that supports self-relative, position-independent addressing. This store-relative instruction may be implemented, for example, on the processor(s) 110 as shown in FIG. 1 to support self-relative, position-independent pointers such as self-relative, pointer 138 shown in FIG. 1.

A store-relative instruction 600 may include two or more operands, a destination address operand 620 and an address operand 610. These operands may each contain an absolute memory address. As discussed in FIG. 1, these absolute memory addresses may be virtual memory addresses in some embodiments while in other embodiments they may be physical memory addresses.

The absolute memory address provided in the destination address 620 may be used to identify a memory location to store a self-relative pointer, in some embodiments. This self-relative pointer may contain an offset 630.

The store-relative instruction 600 may first compare the address 610 to a reserved memory address indicating an invalid memory location. In some embodiments, this reserved memory address indicating an invalid memory location may be included as part of processor instruction set architecture (ISA) while in other embodiments the value may not be predefined by may instead be provided as an additional operand of the load-relative instruction 200. These examples, however, are not intended to be limiting and any number of arrangements for these reserved values may be envisioned.

If the address 610 is equal to the reserved memory address, as shown by a positive exit from 640, then the offset is set to a reserved offset value, as shown in 660. In some embodiments, this reserved offset value may be included as part of processor instruction set architecture (ISA) while in other embodiments the value may not be predefined by may instead be provided as an additional operand of the store-relative instruction 600. These examples, however, are not intended to be limiting and any number of arrangements for these reserved values may be envisioned.

If, however, the address 610 is not equal to the reserved memory address, as shown by a negative exit from 640, then the offset is set to the address 610 minus the destination address 650. Once an offset for the self-relative pointer is determined, the store-relative instruction 600 may store the offset in the destination location identified by the destination address 620.

Figure 7:
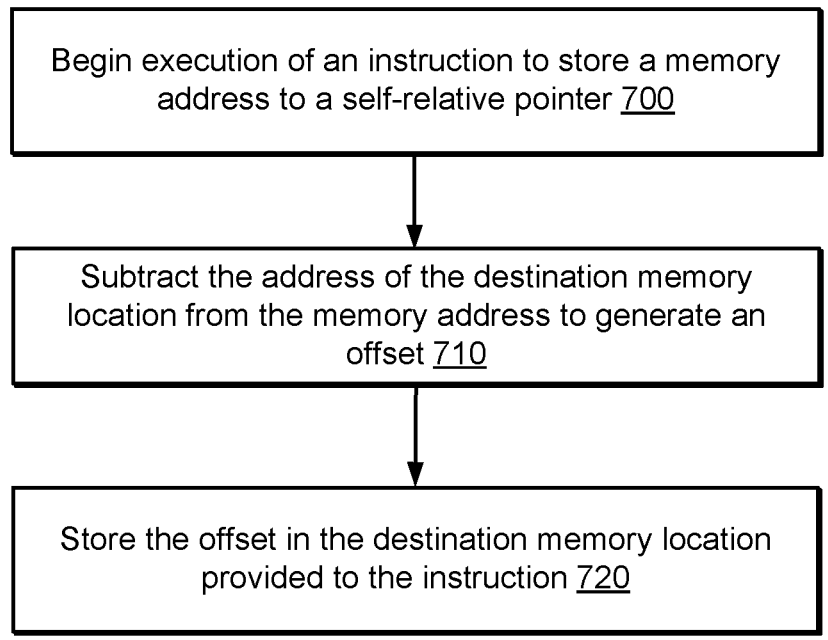
FIG. 7 is a flow diagram illustrating an embodiment of store-relative instruction that supports self-relative, position-independent addressing.

FIG. 7 is a flow diagram illustrating an embodiment of store-relative instruction that supports self-relative, position-independent addressing. The process begins at step 700 where a processor providing self-relative, position-independent addressing, such as the processor(s) 110 as shown in FIG. 1, begins execution of a store instruction, such as the store-relative instruction 600 as shown in FIG. 6, with the store instruction storing a self-relative pointer to a destination memory address, such as the self-relative pointer 138 as shown in FIG. 1. The store instruction may include two or more operands in some embodiments, as discussed in FIG. 2, including a destination address operand and an address operand. As discussed in FIG. 1, memory addresses supported by the store instruction may be virtual memory addresses in some embodiments while in other embodiments they may be physical memory addresses.

As shown in step 710, an offset value may be generated by subtracting the destination memory address operand from the address operand in some embodiments. Then, in step 720, the offset value may be stored in a location specified by the destination address operand in some embodiments.

Figure 8:
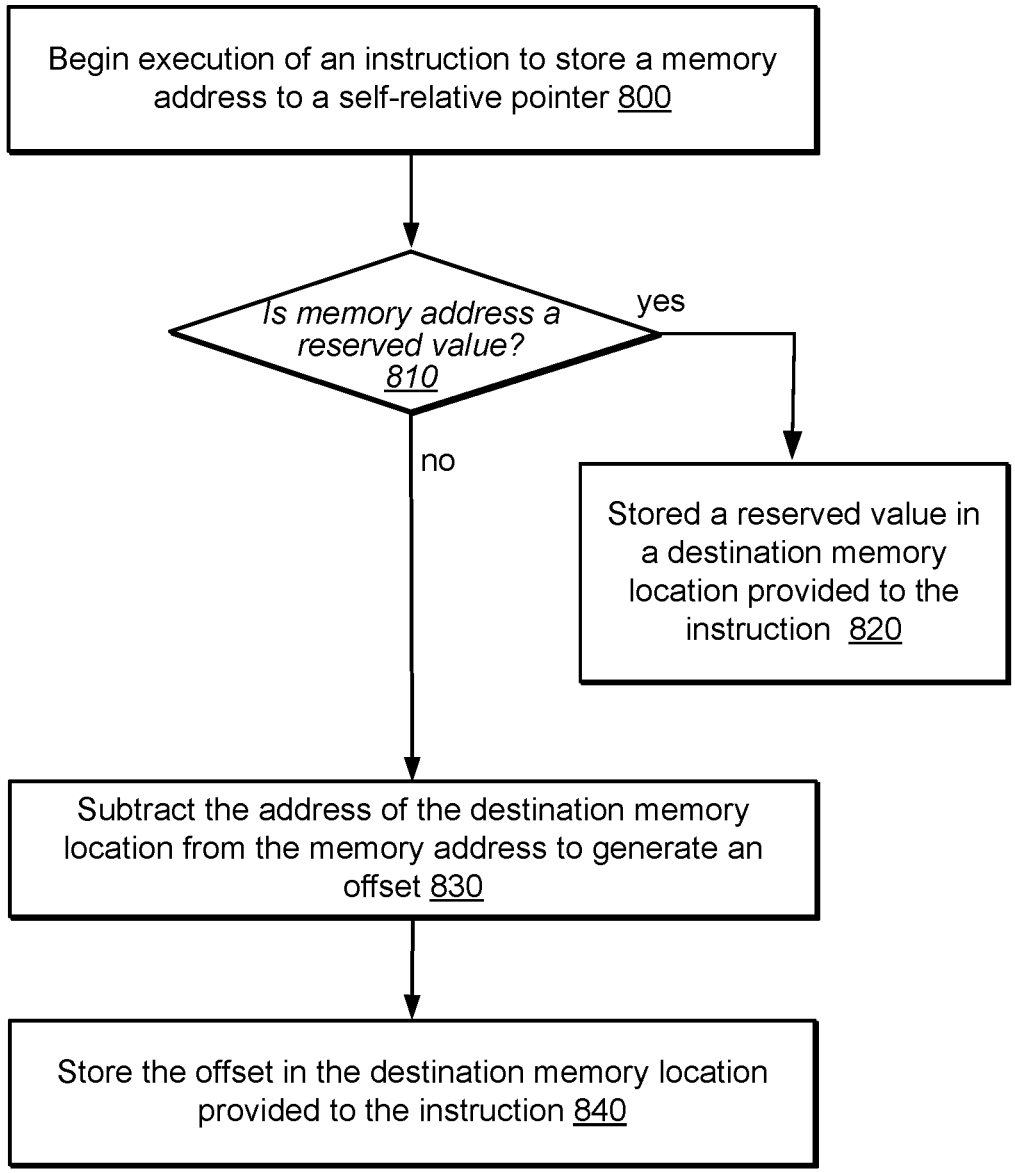
FIG. 8 is a flow diagram illustrating an embodiment of load-relative instruction that supports self-relative, position-independent addressing with invalid address support.

FIG. 8 is a flow diagram illustrating an embodiment of load-relative instruction that supports self-relative, position-independent addressing with invalid address support. The process begins at step 800 where a processor providing self-relative, position-independent addressing, such as the processor(s) 110 as shown in FIG. 1, begins execution of a store instruction, such as the store-relative instruction 600 as shown in FIG. 6, with the store instruction storing a self-relative pointer to a destination memory address, such as the self-relative pointer 138 as shown in FIG. 1. The store instruction may include two or more operands in some embodiments, as discussed in FIG. 2, including a destination address operand and an address operand. As discussed in FIG. 1, memory addresses supported by the store instruction may be virtual memory addresses in some embodiments while in other embodiments they may be physical memory addresses.

As shown in step 810, the address operand may be compared to a reserved memory address value indicating an invalid memory location in some embodiments. In some embodiments, this reserved memory address value indicating an invalid memory location may be included as part of processor instruction set architecture (ISA) while in other embodiments the value may not be predefined by may instead be provided as an additional operand of the store-relative instruction 600. These examples, however, are not intended to be limiting and any number of arrangements for these reserved values may be envisioned.

If the address operand is equal to the reserved memory address value indicating an invalid memory location, as shown in the positive exit from 810, the processor may indicate that the self-relative pointer defines an invalid memory address by storing a reserved offset value indicating an invalid memory location in a location specified by the destination address, as shown in 820, in some embodiments. In some embodiments, this reserved offset value may be included as part of processor instruction set architecture (ISA) while in other embodiments the value may not be predefined by may instead be provided as an additional operand of the store-relative instruction 600. These examples, however, are not intended to be limiting and any number of arrangements for these reserved values may be envisioned.

If, however, the address operand is not equal to the reserved memory address, as shown by a negative exit from 810, then the offset is set to the address operand minus the destination address operand, as shown in 830, in some embodiments. Once an offset for the self-relative pointer is generated, the store-relative instruction 600 may then store the offset in the destination location identified by the destination address operand, as shown in 840, in some embodiments.

Figure 9:
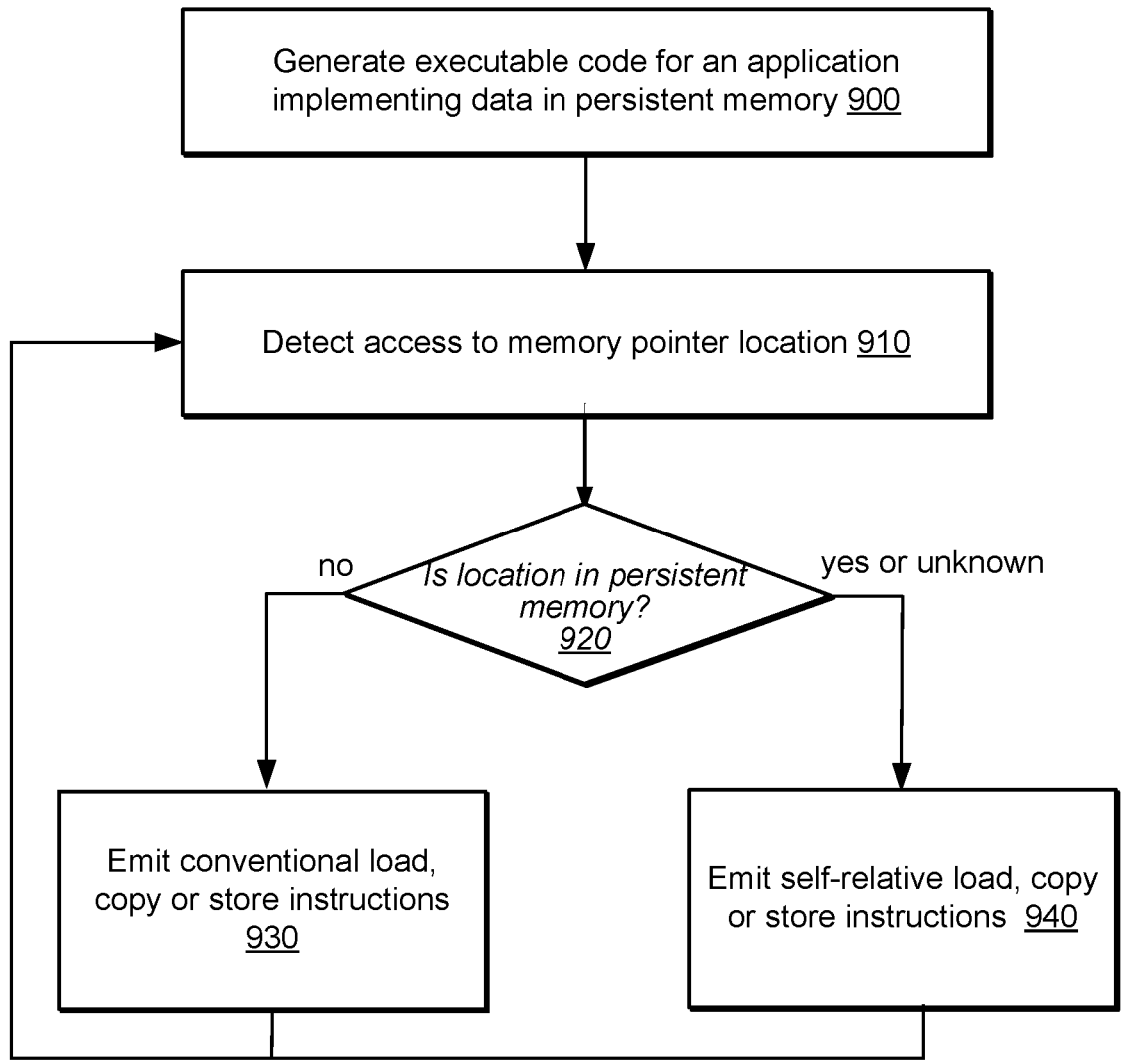
FIG. 9 is a flow diagram illustrating various embodiments of generating executable code supporting persistent data structures and self-relative, position-independent addressing.

FIG. 9 is a flow diagram illustrating various embodiments of generating executable code supporting persistent data structures and self-relative, position-independent addressing. The process begins at step 900 where executable code for an application implementing persistent data structures using self-relative, position-independent addressing may be generated.

During code generation, one or more accesses, either read accesses or write accesses, to memory pointer locations may be detected, in some embodiments. When an access is detected, the pointer location is analyzed, as shown in 920, to determine if the location resides in persistent memory, and therefore may make use of a self-relative, position-independent address.

This analysis may be performed in various ways in different embodiments. For example, in procedural languages, such as C and related languages, a compiler may perform this analysis through language extensions and/or compiler directives. In object-oriented languages, a compiler may perform this analysis through analysis of the object containing the pointer being accessed, where the object may contain metadata describing whether it is implemented in persistent memory, the metadata defined through language extensions and/or compiler directives as in the case of procedural languages. In still other embodiments, code generation may occur at runtime, or in a runtime execution environment, as in the case of interpreted languages such as Java' byte-code. In these embodiments, analysis may exploit available memory mapping information to determine if the containing object is implemented in persistent memory without the use of language extensions. These examples, however, are not intended to be limiting and any number of analysis techniques may be envisioned.

If the location is determined to be in persistent memory, as indicated by a positive exit from 920, or if it cannot be determined that the location resides in persistent memory, then self-relative forms of either load, copy or store instructions should be generated to implement the pointer access, depending on the type of access requested, as shown in 940, in some embodiments.

If the location is determined to not be in persistent memory, as indicated by a negative exit from 920, then conventional forms of either load, copy or store instructions should be generated to implement the pointer access, depending on the type of access requested, as shown in 930, in some embodiments.

Once code is generated for the detected access, the process returns to step 910 where additional pointer accesses may be detected.

Figure 10:
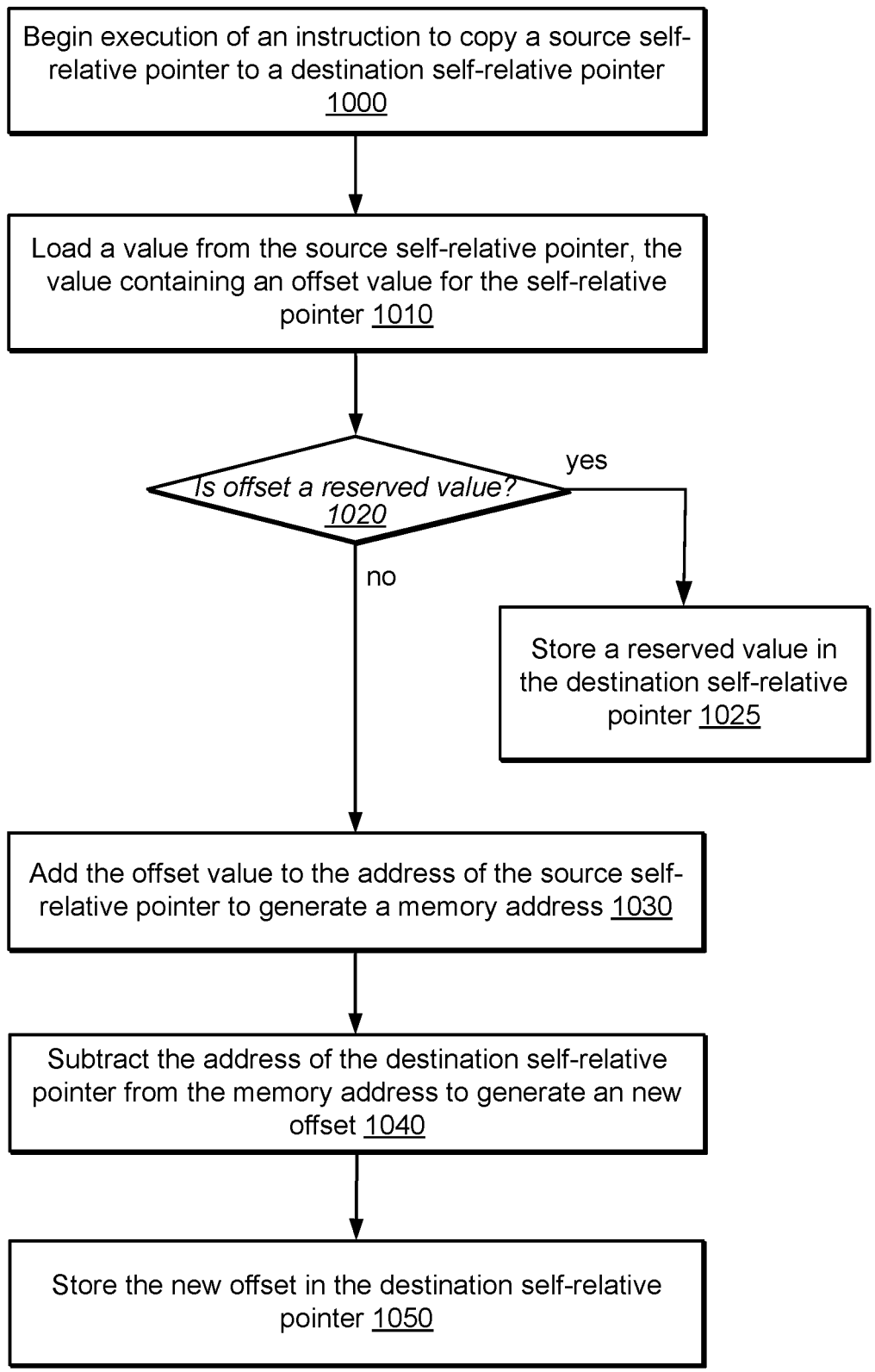
FIG. 10 is a flow diagram illustrating an embodiment of copy-relative instruction that supports self-relative, position-independent addressing with invalid address support.

FIG. 10 is a flow diagram illustrating an embodiment of copy-relative instruction that supports self-relative, position-independent addressing with invalid address support. The process begins at step 1000 where a processor providing self-relative, position-independent addressing, such as the processor(s) 110 as shown in FIG. 1, begins execution of a copy instruction which may a memory address from a source self-relative pointer, such as the self-relative pointer 138 as shown in FIG. 1, and store the memory address to a destination self-relative pointer, such as the self-relative pointer 137 as shown in FIG. 1. The copy instruction may include two or more operands in some embodiments including a source address operand and a destination address operand. As discussed in FIG. 1, memory addresses supported by the load instruction may be virtual memory addresses in some embodiments while in other embodiments they may be physical memory addresses.

As shown in step 1010, an offset value may be loaded from the source self-relative pointer identified by the source address operand, in some embodiments. This offset value may then be compared to a reserved offset value, as shown in 1020, in some embodiments. In some embodiments, this reserved offset value may be included as part of processor instruction set architecture (ISA) while in other embodiments the value may not be predefined by may instead be provided as an additional operand of the copy-relative instruction. These examples, however, are not intended to be limiting and any number of arrangements for these reserved values may be envisioned.

If the offset value is equal to the reserved offset value, as shown in the positive exit from 1020, the processor may indicate that the self-relative pointer defines an invalid memory address by storing the reserved value indicating an invalid memory location in a location specified by the destination address operand, as shown in 1025, in some embodiments. In some embodiments, this reserved memory address indicating an invalid memory location may be included as part of processor instruction set architecture (ISA) while in other embodiments the value may not be predefined by may instead be provided as an additional operand of the copy-relative instruction. These examples, however, are not intended to be limiting and any number of arrangements for these reserved values may be envisioned.

If, however, the offset value is not equal to the reserved offset value, as shown in the negative exit from 1020, the process may advance to step 1030 where the loaded offset value may be added to the source address to generate an absolute memory address.

As shown in 1040, once the absolute memory address is generated, a new offset may be determined by subtracting the destination address from the absolute memory address, in some embodiments. Once the new offset for the self-relative pointer is generated, the copy-relative instruction may then store the offset in the destination location identified by the destination address operand, as shown in 1050, in some embodiments.

Some of the mechanisms described herein may be provided as a computer program product, or software, that may include a non-transitory, computer-readable storage medium having stored thereon instructions which may be used to program a computer system 1100 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1100 may include one or more processors 1110; each may include multiple cores, any of which may be single- or multi-threaded. For example, multiple processor cores may be included in a single processor chip (e.g., a single processor 1110), and multiple processor chips may be included in computer system 1100. Each of the processors 1110 may include a cache or a hierarchy of caches (not shown) in various embodiments. For example, each processor chip 1110 may include multiple L1 caches (e.g., one per processor core) and one or more other caches (which may be shared by the processor cores on a single processor).

Figure 11:
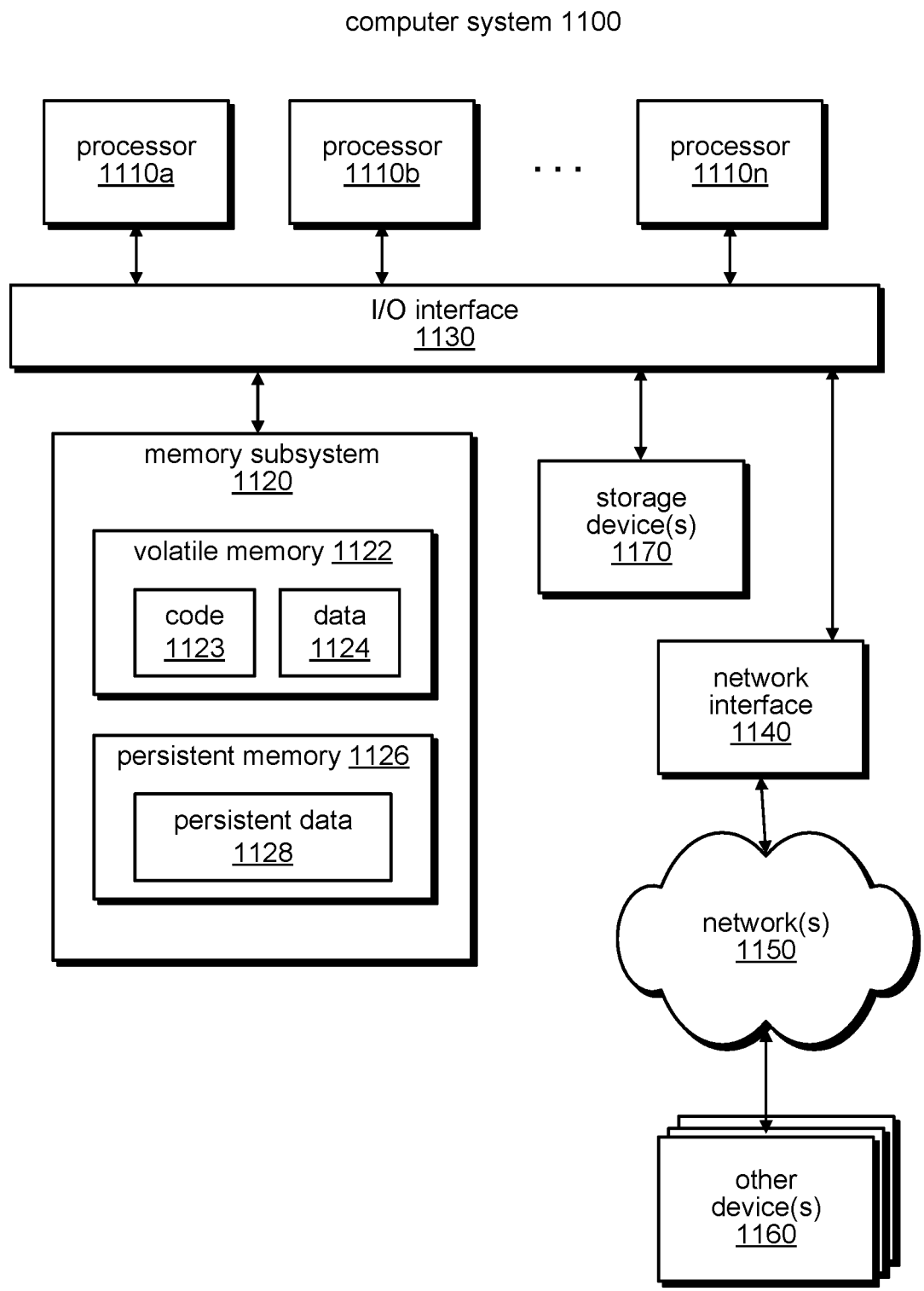
FIG. 11 is a block diagram illustrating one embodiment of a computing system that is configured to implement summation of logarithmically encoded data values, as described herein.

The computer system 1100 may also include one or more storage devices 1170 (e.g. optical storage, magnetic storage, hard drive, tape drive, solid state memory, etc.) and a memory subsystem 1120. The memory subsystem 1120 may further include one or more volatile memories (e.g., one or more of cache, SRAM, DRAM, RDRAM, EDO RAM, DDR RAM, SDRAM, Rambus RAM, EEPROM, etc.). In some embodiments, one or more of the storage device(s) 1170 may be implemented as a module on a memory bus (e.g., on I/O interface 1130) that is similar in form and/or function to a single in-line memory module (SIMM) or to a dual in-line memory module (DIMM). The memory subsystem 1120 may further include one or more byte-addressable persistent memories (PMEM), (e.g. Nonvolatile RAM (NVRAM), Intel Optane Persistent Memory, etc.) Various embodiments may include fewer or additional components not illustrated in FIG. 11 (e.g., video cards, audio cards, additional network interfaces, peripheral devices, a network interface such as an ATM interface, an Ethernet interface, a Frame Relay interface, etc.)

The one or more processors 1110, the storage device(s) 1170, and the memory subsystem 1120 may be coupled to the I/O interface 1130. The memory subsystem 1120 may contain application data 1124 and program code 1123. Application data 1124 may contain various data structures while program code 1123 may be executable to implement one or more applications, shared libraries, and/or operating systems. The memory subsystem 1120 may further contain persistent data 1128 stored in the PMEM 1126 which may persist across system shutdowns and restarts, among other possible system events.

Program instructions 1125 may be encoded in platform native binary, any interpreted language such as Java™ byte-code, or in any other language such as C/C++, the Java™ programming language, etc., or in any combination thereof. In various embodiments, applications, operating systems, and/or shared libraries may each be implemented in any of various programming languages or methods. For example, in one embodiment, operating system may be based on the Java™ programming language, while in other embodiments it may be written using the C or C++ programming languages. Similarly, applications may be written using the Java™ programming language, C, C++, or another programming language, according to various embodiments. Moreover, in some embodiments, applications, operating system, and/shared libraries may not be implemented using the same programming language. For example, applications may be C++ based, while shared libraries may be developed using C.

Although the embodiments above have been described in considerable detail, numerous variations and modifications will become apparent to those skilled in the art once the above disclosure is fully appreciated. For example, although many of the embodiments are described in terms of particular types of operations that support self-relative addressing of memory within applications that access data in persistent, it should be noted that the techniques and mechanisms disclosed herein for providing self-relative addressing may be applicable in other contexts in which applications access and/or operate on different types of data than those described in the examples herein. It is intended that the following claims be interpreted to embrace all such variations and modifications.

What is claimed:

1. A system, comprising:
a processor implementing self-relative memory addressing; and
a memory storing program instructions that when executed by the processor cause the processor to:
execute a load instruction to load a memory address from a self-relative pointer, wherein the load instruction identifies a source memory address, and wherein to execute the load instruction, the processor is configured to:
load an offset value stored in the identified source memory address; and
responsive to determining that the loaded offset value is different from a reserved value:
add the loaded offset value to the identified source memory address to determine the memory address; and
store the determined memory address in a destination location of the load instruction; and
execute a second load instruction to load another memory address from a self-relative pointer, wherein the second load instruction identifies a second source memory address, and wherein to execute the second load instruction, the processor is configured to:
load a second offset value stored in the identified second source memory address;
responsive to determining that the loaded second offset value matches the reserved value, store a memory address value indicating an invalid memory pointer in a destination location of the load instruction.

2. The system of claim 1, the memory storing additional program instructions that when executed by the processor cause the processor to:
execute a store instruction to store a second offset value of another self-relative pointer to a destination memory address, wherein to execute the store instruction, the processor is configured to:
responsive to determining that the other self-relative pointer is a valid memory address:
subtract the destination memory address from the other self-relative pointer to generate the second offset value; and
store the second offset value in a memory location identified by the other self-relative pointer.

3. The system of claim 1, the memory storing additional program instructions that when executed by the processor cause the processor to:
execute a store instruction to store a second offset value of another self-relative pointer to a destination memory address, wherein to execute the store instruction, the processor is configured to:
responsive to determining that the other self-relative pointer is an invalid memory address:
storing the reserved value in a memory location identified by the other self-relative pointer.

4. The system of claim 1, wherein the destination location is identified in the load instruction.

5. The system of claim 1, wherein the reserved value is identified in the load instruction.

6. A method comprising:
executing, by a processor implementing self-relative memory addressing, a load instruction to load a memory address from a self-relative pointer, the load instruction identifying a source memory address, and the executing of the load instruction performing at least:
loading an offset value stored in the identified source memory address; and
responsive to determining that the loaded offset value is different from a reserved value:
adding the loaded offset value to the identified source memory address to determine the memory address; and
storing the determined memory address in a destination location of the load instruction; and
executing, by the processor, a second load instruction to load another memory address from a second self-relative pointer, the second load instruction identifying a second source memory address, and the executing of the second load instruction performing at least:
loading a second offset value stored in the identified second source memory address;
responsive to determining that the loaded second offset value matches the reserved value, generating an exception indicating that the second offset value is invalid.

7. The method of claim 6, further comprising:
executing, by the processor, a store instruction to store a second offset value of another self-relative pointer to a destination memory address, the executing of the store instruction performing at least:
responsive to determining that the other self-relative pointer is a valid memory address:
subtracting the destination memory address from the other self-relative pointer to generate the second offset value; and
storing the second offset value in a memory location identified by the other self-relative pointer.

8. The method of claim 6, further comprising:
executing, by the processor, a store instruction to store a second offset value of another self-relative pointer to a destination memory address, the executing of the store instruction performing at least:
responsive to determining that the other self-relative pointer is an invalid memory address:
storing the reserved value in a memory location identified by the other self-relative pointer.

9. The method of claim 6, wherein the destination location is identified in the load instruction.

10. The method of claim 6, wherein the reserved value is identified in the load instruction.

11. The method of claim 6, wherein the reserved value is identified in an instruction set architecture associated with the processor.

12. A processor implementing self-relative memory addressing, configured to:
execute a store instruction to store an offset value of a self-relative pointer to a destination memory address, wherein to execute the store instruction the processor is configured to:
responsive to determining that the self-relative pointer is a valid memory address:
subtract the destination memory address from the self-relative pointer to generate the offset value; and
store the offset value in a memory location identified by the self-relative pointer.

13. The processor of claim 12 further configured to:
execute a second store instruction to store a second offset value of a second self-relative pointer to a second destination memory address, wherein to execute the second store instruction the processor is configured to:
responsive to determining that the second self-relative pointer is an invalid memory address:
store a reserved value in a memory location identified by the other self-relative pointer.

14. The processor of claim 13, wherein the reserved value is identified in the load instruction.

15. The processor of claim 13, wherein the reserved value is identified in an instruction set architecture associated with the processor.

16. The processor of claim 13 further configured to:
execute a load instruction to load a memory address from another self-relative pointer, the load instruction identifying a source memory address, wherein to execute the load instruction the processor is configured to:
loading another offset value stored in the identified source memory address;
responsive to determining that the other offset value is different from the reserved value:
add the other offset value to the identified source memory address to determine the memory address; and
store the determined memory address in a destination location of the load instruction.

17. The processor of claim 16, wherein the destination location is identified in the load instruction.

18. The processor of claim 13 further configured to:
execute a load instruction to load a memory address from another self-relative pointer, the load instruction identifying a source memory address, wherein to execute the load instruction the processor is configured to:
load another offset value stored in the identified source memory address;
responsive to determining that the other offset value is different from the reserved value, generate an exception indicating that the other offset value is invalid.

* * * * *

UNITED STATES PATENT AND TRADEMARK OFFICE
CERTIFICATE OF CORRECTION

| | | |
|---|---|---|
| PATENT NO. | : 12,131,163 B2 | Page 1 of 1 |
| APPLICATION NO. | : 17/246482 | |
| DATED | : October 29, 2024 | |
| INVENTOR(S) | : Wolczko | |

It is certified that error appears in the above-identified patent and that said Letters Patent is hereby corrected as shown below:

In the Specification

In Column 10, Line 31, delete "Java'" and insert -- Java™ --, therefor.

Signed and Sealed this
Fourth Day of February, 2025

Coke Morgan Stewart
*Acting Director of the United States Patent and Trademark Office*